United States Patent [19]

Bannister

[11] Patent Number: 4,646,834

[45] Date of Patent: Mar. 3, 1987

[54] AQUEOUS TREATMENT FLUID AND METHOD OF USE

[75] Inventor: Charles E. Bannister, Tulsa, Okla.

[73] Assignee: Dowell Schlumberger Incorporated, Tulsa, Okla.

[21] Appl. No.: 189,541

[22] Filed: Sep. 22, 1980

[51] Int. Cl.$^4$ ........................ E21B 33/13; E21B 43/00
[52] U.S. Cl. .................................. 166/291; 252/8.55
[58] Field of Search ................... 252/8.55 R; 166/291

[56] References Cited

U.S. PATENT DOCUMENTS

| | | | |
|---|---|---|---|
| 3,081,260 | 3/1963 | Park | 252/8.5 |
| 3,291,211 | 12/1966 | Savins et al. | 166/312 X |
| 3,613,790 | 10/1971 | Stout et al. | 166/294 |
| 3,884,302 | 5/1975 | Messenger | 166/291 |
| 4,083,407 | 4/1978 | Griffin et al. | 166/291 |
| 4,141,843 | 2/1979 | Watson | 166/291 X |
| 4,217,229 | 8/1980 | Watson | 252/8.55 |
| 4,276,182 | 6/1981 | Beirute | 166/291 X |
| 4,302,341 | 11/1981 | Watson | 252/8.55 |
| 4,304,300 | 12/1981 | Watson | 252/8.55 X |

FOREIGN PATENT DOCUMENTS 682637   8/1979   U.S.S.R. ............... 166/291

OTHER PUBLICATIONS

Applied Engineered Cementing, by Byron Jackson, Inc., 1969, title pages and pp. 53–56.

*Primary Examiner*—Herbert B. Guynn
*Attorney, Agent, or Firm*—L. Wayne White

[57] ABSTRACT

A composition designed for dissolution or dispersion in water to give an aqueous treatment fluid having a yield point of zero, at a temperature between about 85° and about 160° F., which is compatible with cement slurries and with drilling muds and a method of using same to displace a drilling mud from a borehole which penetrates a subterranean formation, particularly immediately preceding the injection of a fluid such as a cement slurry, and which also exhibits good fluid loss control and may be adapted for use with either water-based or oil-based drilling muds. The composition comprises three components, a water soluble viscosifier which increases the viscosity of water under mixing and handling conditions but which becomes substantially insoluble in water when exposed to temperatures encountered downhole in a wellbore; a second component, a thickener, which is soluble or dispersible in and which increases the viscosity of water at temperatures experienced under downhole conditions; and a third component, a dispersant, which enhances the dispersibility of the first component in water and thereby permits it to go smoothly into solution. The composition optionally comprises a nonionic surfactant which may be added to improve the compatibility with an oil-based drilling mud of an aqueous treatment fluid prepared from the composition. The composition also optionally comprises a weighting agent to impart increased density to a treatment fluid prepared therefrom. When combined with water, the resultant aqueous treatment fluid, at a temperature between about 85° and about 160° F., has a kinematic viscosity of greater than about 0.1 and less than about 7.5 centipoise-gallons/pound.

18 Claims, No Drawings

AQUEOUS TREATMENT FLUID AND METHOD OF USE

BACKGROUND OF THE INVENTION

The invention pertains to a composition which when intimately mixed with water forms an aqueous treatment fluid suitable for use as a well completion or spacer fluid in the drilling of oil and gas wells or other boreholes in subterranean formations. It also relates to a method of using such an aqueous treatment fluid as a spacer composition, particularly in the context of cementing casing in a wellbore.

Rotary drilling techniques are commonly used for drilling wells in the earth through subterranean formations of sandstone, shale, limestone, etc. In such rotary drilling, a drilling fluid or "drilling mud" is circulated between the surface of the earth and the bottom of the well. Drilling muds which are commonly used include water-based muds comprising both clay and polymer containing muds, oil-based muds and emulsions. Drilling muds serve many useful purposes including the removal of earth and rock cuttings from the well, control of formation pressures, and cooling and lubrication of the drill bit which is used in drilling the well. However, there are also certain detrimental characteristics associated with drilling muds. Among the problems associated with drilling muds is that drilling muds tend to flow from the well into exposed permeable formations with the result that mud solids are filtered out on the wall of the well and a filter cake is formed. Even thin filter cakes are detrimental in the completion of wells because they sometimes interfere with the formation of a good cement bond between the wall of the wellbore and the casing positioned in this wellbore. Also, drilling muds frequently contain components which are incompatible with a fluid which one may desire to inject into a well containing such mud. For example, it has long been recognized that if certain cement slurries containing free polyvalent metal cations, especially calcium, are brought into contact with muds containing clay or certain polymers, a very viscous and detrimental plug can form in the vicinity of the mud-cement interface. The problems created by such a highly viscous mud-cement interface are well known in the well cementing art. Another example of mud-cement incompatibility is that lignins, which are frequently used as dispersants in high density muds, can cause excessive retardation in cements if cement becomes comingled with the mud.

Consequently, various techniques have been devised for the removal of drilling muds from a borehole, particularly in the context of injecting a fluid into the borehole which is incompatible with the mud, more specifically in the context of cementing. A common technique is to employ a "spacer" or a "chemical wash". Although it is not always clear in the literature whether a fluid is a spacer or a chemical wash, a spacer is generally characterized as a thickened composition which functions primarily as a fluid piston in displacing the mud. Spacers frequently contain appreciable quantities of weighting agents to impart a desired density to the spacer fluid. Chemical washes, on the other hand, are generally thin fluids which are effective principally as the result of turbulence, dilution, and surfactant action on the mud and mud filter cake. Chemical washes often contain solids to act as an abrasive but the solids content is significantly lower than in spacers because the washes are generally too thin to have good solids carrying capacity.

The art of preparing and using spacers and chemical washes is discussed in detail in U.S. Pat. No. 4,083,407, the teachings of which are hereby incorporated by reference. Of particular interest is U.S. Pat. No. 3,291,211, Savins et al. which describes a process for removing mudcake from the wall of a borehole and then cementing casing in such a wellbore by using a fluid said to have "viscoelastic" properties as a spacer to displace a mudcake from the annulus. The viscoelastic fluid is said to be prepared from an oil-miscible solvent for use with an oil-based drilling mud or from water or water-miscible solvent in the case of use with a water-based drilling mud. Viscoelastic properties are imparted to the spacer fluids by the addition of various solutes to the respective solvents. Among the solutes mentioned are high molecular weight cellulose derivatives such as carboxymethylcellulose (CMC) and hydroxyethylcellulose (HEC), polyethylene oxides, sulfonated polystyrenes, polyacrylamides and partially hydrolyzed polyacrylamides, natural gums, fatty acid soaps, etc. Savins prefers that his viscoelastic fluids be such that a normal stress of at least 2,000 dynes per square centimeter is developed in a rotating viscometer.

In U.S. Pat. No. 4,141,843, Watson discloses a nondamaging spacer fluid comprising weighting agents dispersed in water, a polymer viscosifier and several other components. The spacer is said to be stable over a temperature range of about 32°–300° F. for extended periods of time. The fluids described by Watson employ as preferred viscosifiers water soluble polysaccharides, especially hydroxyalkylcelluloses having two to three carbon atoms in the hydroxyalkyl groups. The spacer fluids prepared by Watson are said to be non-Newtonian in character, i.e. they have yield points which are not equal to zero.

In a publication entitled "Applied Engineered Cementing" (1969) by Byron Jackson, Inc., pages 54–55, a "cementing preflush", or spacer as the term is used herein, designated Mud-Sweep is described as a high viscosity, aqueous solution having a density which can be adjusted from 8.6 to as high as 18 pounds per gallon. That spacer is said to operate on a "viscous sweep" principle to accomplish maximum mud removal regardless of the flow rate. It is said not to be necessary to attain turbulent flow to achieve excellent mud removal. The composition of the spacer is not disclosed, however it is stated to be highly viscous yet thixotropic, to contain de-oiling chemicals that tend to preferentially water wet the casing and wellbore and to also contain additives that "flocculate clay-base drilling muds, forming a viscous interface that aids in sweeping mud from the annulus". Obviously, that spacer is incompatible with many drilling fluids.

In U.S. Pat. No. 4,083,407 CMC and HEC are employed by Griffin et al. as fluid loss control additives. The spacer itself is thickened with a polyvalent metal silicate.

SUMMARY OF THE INVENTION

The present invention has both the properties of a spacer and a chemical wash. It comprises a composition especially designed to be soluble or dispersible in water providing a resultant aqueous treatment fluid of sufficient thickness or "viscosity" to permit suspension therein of a quantity of weighting agent sufficient to impart a desired density to the thus-weighted aqueous treatment fluid. The treatment fluid is prepared with suitable viscosifiers and thickeners such that a thick fluid is attained that is sufficiently viscous to suspend the desired weighting agents upon mixing, blending, handling and transportation of the so-weighted fluid at temperatures encountered during field operations and yet the aqueous treatment fluid will experience a sufficient viscosity loss under downhole conditions to attain a kinematic viscosity which permits the treatment fluid to go into turbulent flow at reasonable pumping rates, e.g. less than 16, preferably less than 12 and more preferably less than 8 barrels per minute.

Stated another way, the treatment fluid is designed to be a pseudoplastic fluid at temperatures of mixing and handling yet become a Newtonian fluid at the temperatures encountered under downhole conditions when the fluid is pumped in the annulus between a borehole and a casing or some other void space in a subterranean borehole. Since the fluid is designed to go into turbulent flow, the turbulence generally will be sufficient to suspend the solid particulate materials which are commonly employed as weighting agents. However, it is preferable that the treatment fluid maintain sufficient viscosity under downhole conditions to suspend such particulate material under static or plug or laminar flow conditions. Consequently, it is preferred that under downhole temperature conditions a kinematic viscosity be maintained equal to 15 centipoise/P, where P is defined as the density of the treatment fluid in pounds per gallon. This is particularly desirable if the possibility of pump stoppage or breakdown is present.

In the invention, the preferred composition to be used in obtaining such an aqueous treatment fluid is prepared by combining at least three components. The first is a viscosifier which is readily soluble in water at a temperature between about 40° and 100° F. and which becomes substantially insoluble in the treatment fluid at the temperatures encountered under downhole conditions, commonly referred to as bottom hole circulating temperature (hereafter B.H.C.T.). The second component is a thickener capable of dispersion or solution in water which will impart sufficient viscosity to the water at the B.H.C.T. encountered when the first component loses its viscosifying capabilities. A third component, a dispersant, is employed to enhance the dispersibility of the first component and thereby to simplify and expedite field mixing of the composition with water to form the aqueous treatment fluid. The components are combined in such amounts that when dispersed in water, together with an amount of weighting agent required to impart the desired viscosity to the fluid, the aqueous treatment fluid will attain a kinematic viscosity of greater than about 0.1 and less than about 7.5 centipoise-qallon/pound at a temperature between about 85° and about 160° F.

The invention further comprises a method of injecting a fluid into a borehole containing drilling mud when such a fluid is not compatible with the mud and where the injection of the fluid is preceded by injection of a spacer composition compatible with both mud and the fluid. The spacer fluid in this application is the aqueous treatment fluid of the invention and it is injected at a velocity which exceeds the critical velocity for the aqueous treatment fluid in the given borehole at the B.H.C.T. of the borehole. By critical velocity, is meant the rate at which the aqueous treatment fluid must be pumped to achieve turbulent flow for that B.H.C.T.

FURTHER DETAILED DESCRIPTION OF THE INVENTION

Several terms which are used throughout in the description and explanation of the invention should be defined at this point. The term "viscosity" is used in several different contexts. When viscosity is merely referred to by itself, it is used in the lay sense to mean a property of thickness or viscousness which a fluid has. The term "apparent viscosity" is a quantification of the thickness of a fluid and is expressed here in centipoise units derived from a measurement at 300 RPM ($\theta_{300}$) by use of a simple conversion factor. The 300 RPM readings are taken on a model 35 Fann VG Viscometer with R1-B1 rotor/ bob combination and a spring factor of one. The term "yield point" refers to an empirically derived quantity calculated as the difference between twice the 300 RPM reading and the 600 RPM reading for a fluid (expressed as $2\theta_{300} - \theta_{600}$). The yield point is important in characterization of the fluid'3 s behavior as either Newtonian or non-Newtonian. A fluid having a yield point of zero at a given temperature exhibits Newtonian behavior at that temperature. The temperature at which the yield point of a fluid goes to zero is called its "transition temperature". The density of a fluid as referred to herein is expressed in pounds per gallon and is, unless otherwise stated, measured at 80° F. and represented by the term "P". The term "kinematic viscosity" refers to a property of a fluid calculated by dividing the apparent viscosity of the fluid, expressed in centipoise, by the density of the fluid P, expressed in pounds per gallon. The term "pseudoplastic" as used herein refers to the behavior of a fluid which has a yield point which is a positive number at a given temperature and whose apparent viscosity decreases with increased rates of shear. The transition temperature for a pseudoplastic material is the temperature at which it looses its pseudoplastic properties and assumes Newtonian behavior, i.e. the temperature at which its yield point goes to zero. Another property of various fluids described herein is fluid loss and it is determined according to API methods.

Throughout the specification, Component A, the viscosifier, is referred to as becoming substantially insoluble in water at some temperature. By substantially insoluble is meant that a fluid consisting of Component A and water experiences a loss in apparent viscosity such that the apparent viscosity of the resultant fluid is approximately two centipoise or less. The temperature at which this occurs is approximately the transition temperature of that fluid and the fluid becomes essentially a Newtonian fluid since it is predominantly water. Throughout the specification, the aqueous treatment fluid of the invention is referred to as being "compatible" with cement slurries and drilling muds. By compatible is meant that when the aqueous treatment fluid and cement slurry or mud are intimately mixed in about 50—50 ratios by volume, the apparent viscosity of the resulting mixture does not exceed the apparent viscosity of either of the components by more than about 20 percent.

The composition of the invention includes both a dry mixture comprising three or more components and aqueous treatment fluids derived from this dry mixture by combining with water. The first component, Component A, is a viscosifier which is soluble in and increases the kinematic viscosity of water before being exposed to the sort of temperatures which would be encountered downhole but which becomes substantially insoluble in water at such downhole temperatures. The second component, Component B is a thickener which is soluble or dispersible in water and increases water's kinematic viscosity even at temperatures encountered under downhole conditions. The third component, a dispersant, is included in the composition to enhance the dispersibility of the first component in water. It is desirable to smoothly and easily disperse Component A in water to achieve a complete solution within as short a time as possible and avoid the problems created in field mixing which are caused if the first component forms insoluble lumps and gels upon introduction into water. When Component A is of such a nature that it contains a built-in dispersant or does not need one, then Component C may be omitted. In a preferred embodiment, a fourth component, a weighting agent, is included with the first three components before the mixture is dispersed in water to form an aqueous treatment fluid. Any weighting agent not incompatible with the other components or with cement slurries or drilling muds may be employed for this purpose. In another preferred embodiment, an additional component, a nonionic surfactant, is added to the composition to enhance the compatibility of the resultant aqueous treatment fluid with oil-based drilling muds. This nonionic surfactant component will not be required in the instances where Component A is of such a character as to have inherent surfactant properties and thereby render the resultant aqueous treatment fluid compatible with such muds.

Component A is suitably selected from hydroxyalkylcelluloses which are generally nonionic in nature and which commonly have inherent surfactant properties due to their chemical nature. Such materials are hydroxyethylcellulose, hydroxypropylcellulose, hydroxybutylcellulose, hydroxyethylmethylcellulose, hydroxypropylmethylcellulose, and hydroxybutylmethylcellulose. Hydroxyalkylcelluloses in which the hydroxyalkyl groups are hydroxypropyl or hydroxybutyl are preferred for use in the invention. These materials come in a wide variety of molecular weights and in varying degrees of hydroxyalkyl and methoxyl substitution on the hydroxyl groups pendant on the backbone of the cellulose chains. Depending on the molecular weight of the hydroxyalkylcellulose employed, greater or lesser quantities of the material will be required to impart the desired thickness to the resulting aqueous treatment fluid, with molecular weight and amount required to impart a given viscosity being inversely proportional.

The temperature at which a hydroxyalkylcellulose becomes substantially insoluble in water may vary widely and depends primarily on the degree and type of hydroxyalkyl substitution and the degree of methoxyl substitution on the cellulose backbone. Hydroxyalkyl substituents are more hydrophobic in the increasing order hydroxyethyl, hydroxypropyl, and hydroxybutyl. Generally, the higher the degree of hydrophobic substitution, the lower will be the temperature at which the material becomes substantially insoluble in water, this temperature being commonly known as the "gel temperature". The gel temperature of a given material is also affected by the presence of other solutes in aqueous solution. Commonly, inorganic salts such as sodium chloride and potassium chloride serve to depress the gel temperature of a given hydroxyalkylcellulose solution and the viscosifying effect of a given amount of Component A may also be decreased in a corresponding fashion. The gel temperature of a given aqueous solution of a hydroxyalkylcellulose may be raised and the viscosifying effect of a given amount of the hydroxyalkylcellulose enhanced by the presence of various surfactants or wetting agents such as the type of dispersants employed as Component C, glycols or glycol ethers and other nonionic surfactants.

Consequently, routine experimentation may be employed with the knowledge of the foregoing teachings to select an appropriate viscosifier in appropriate amounts together with sufficient quantities of a dispersant or a salt to raise or lower the corresponding gel temperature of the resultant solution, respectively. In this fashion, an aqueous treatment fluid with a wide range of gel temperatures may be designed as appropriate for the downhole temperatures to be encountered in the intended use. Manufacturer's literature for most hydroxyalkylcellulose products is available describing the respective gel temperature of these products as well as the effect of various solutes, such as salts and dispersant, on the gel temperature and the viscosity of their resultant aqueous solutions.

Because of the ease of dispersion under field conditions and because they possess gel temperatures within the range commonly encountered under downhole conditions, hydroxypropylcelluloses and hydroxypropylmethylcelluloses are preferred in the instant invention. Most preferred are hydroxypropylcelluloses, embodiments of which will be described more fully herein. For higher downhole temperatures, however, hydroxyethylcelluloses which generally have higher gel temperatures would be useable.

Component B, a thickener, is dispersible or soluble in water and increases the kinematic viscosity of water at the temperatures encountered under downhole conditions, i.e. it does not have a gel temperature in the range that Component A does and therefore can maintain the aqueous treatment fluid in a somewhat thickened state under downhole conditions. For this purpose, various polymers may be employed, including some of those useful at higher temperatures as Component A if the temperature to which the aqueous treatment fluid will be exposed downhole is less than the gel temperature of Component B. In such a situation, a material with a gel temperature within the range of downhole conditions will be chosen as Component A instead. Representative materials are hydroxyalkylcelluloses having gel temperatures generally in excess of 160° F., for example some hydroxyethylcelluloses and some hydroxypropylmethylcelluloses and carboxymethylcellulose. Such polymers are benefically combined with a water-swellable extender such as a water-swellable clay, which will impart added thickening to the aqueous treatment fluid but which will not be as sensitive to temperature as some of the natural and synthetic higher polymers are. Of the types of water-swellable clays, attapulgites and bentonites, especially sodium bentonites, are particularly preferred. When employing a mixture of polymer and a water-swellable extender, it is preferable to use about equal weight proportions of the two components or ratios of extender to polymer of about two or three to one.

As Component C, practically any water soluble dispersant may be employed. Anionic and cationic dispersants such as sodium dodecylbenzenesulfonate, sodium alkylsulfonate, fatty alkyl benzyl ammonium chlorides, diethanolamine or triethanolamine fatty sulfates and the like serve such purpose. Preferably, the dispersant is selected from sulfonated hydrocarbon compounds and their salts and more preferably from sulfonated aromatic hydrocarbons and their salts. Materials such as sodium alkylbenzene sulfonates and sodium polynaphthalene sulfonates serve well as Component C. Generally, lignins and their sulfonated derivatives as well as sugar derivatives are preferably avoided for use as a dispersant in this application since they tend to retard the setting of cement slurries. Where retardation of cement setting is not detrimental, they may also be employed.

As weighting agent, any commonly used weighting agent for drilling muds and cement slurries may generally be employed in the instant invention. Material such as carbonates of calcium may be suitable in instances where calicum ions are not incompatible with drilling muds to be encountered, and iron carbonate, various iron oxides such as hematite or ilmenite, and barium sulfate (commonly known as barite), are common agents that may be employed. Because of its wide use and ready availability, the use of barite as a weighting agent for the aqueous treatment fluid is preferred, especially when densities of between about 9 and about 18 pounds per gallon are desired. When preparing aqueous treatment fluids with densities in excess of 18 pounds per gallon, it is preferred to incorporate incremental amounts of a denser agent such as ilmenite in a treatment fluid which has already been weighted to about 18 pounds per gallon with barite.

In many instances where a hydroxyalkylcellulose is employed in Component A, the resulant aqueous treatment fluid will have reasonable compatibility with oil-based drilling muds, since such cellulosics commonly have the attribute of built-in surfactancy. However, in instances where empirical mixing tests indicate unacceptable thickening of mixtures of the aqueous treatment fluid and an oil-based mud, minor amounts of a nonionic surfactant may be incorporated in the invention composition and the resulting aqueous treatment fluids. Preferably employed is a nonionic, alkoxylated alcohol, more preferably an alkoxylated-alkanol or -alkylphenol and most preferably an ethyoxylated derivative of such an alcohol.

Because of the wide variety of conditions under which the invention composition and resultant aqueous treatment fluid will be employed, it is useful to define the relative amounts of the components to be employed in terms of empirical tests which relate to the characteristic properties of the aqueous treatment fluid which are desired and are defined herein. For example, it is preferred that the aqueous treatment fluid exhibit a kinematic viscosity of less than about 7.5, more preferably less than about 6.5, and most preferably less than about 4 centipoise-gallons/pound and greater than about 0.1, more preferably greater than about 0.3 and most preferably greater than about 0.5 centipoise-gallons/pound, at a temperature between about 85° and about 160° F. Since it is also desirable that the treatment fluid exhibit Newtonian properties within that temperature range, i.e. have a yield point of zero in that range, one may select the appropate amounts of Components A, B, C to combine with a given quantity of water to give a fluid having the desired initial thickness as well as a viscosity reduction at the downhole temperature under which the treatment fluid will be employed. Generally, the total amount of Components A, B and C required to attain the desired properties will be about 1 to 10 percent based upon the weight of water employed to prepare the aqeuous treatment fluid. At this level, an aqueous fluid with a density of about 8.5 pounds per gallon will result. To such a fluid, the appropriate amount of weighting agent required to attain the final desired density may easily be calculated or determined empirically by adding weighting agent in increments and measuring the resultant densities.

In a preferred mode, the relative amounts of the basic components will be about one to fifteen parts Component A; about 5 to 40 parts, Component B, about 1 to 25 parts, Component C; and about 0 to 20 parts nonionic surfactant, all parts by weight. In preparing a preferred aqueous treatment fluid, Component A comprises about 0.1 to about 1.5 percent, Component B comprises about 0.5 to about 4 percent, Component C comprises about 0.1 to about 2.5 percent, a nonionic surfactant comprises about 0 to about 2 percent and water comprises about 90 to about 98 percent of the combined weight of these components of the treatment fluid. When weighting agent is employed it is preferably added in an amount ranging from about 1.5 percent to about 150 percent of the unweighted aqueous treatment fluid. Operable ranges can be easily determined by routine experimentation based on these general ranges and the ininformation contained hereafter in the specific embodiments of the invention.

The composition of the invention may also contain other common treatment fluid ingredients such as fluid loss control additives, dyes, anti-foaming agents where necessary and the like, employed in their usual quantities. Of course, the addition of such other additives should be avoided if it will detrimentally affect the basic desired properties of the aqueous treatment fluid or if they will interact detrimentally with the drilling muds or cement slurries.

The aqueous treatment fluid of the invention is beneficially employed as a compatible fluid in a borehole between a drilling mud and a second fluid which is to be injected to displace the drilling mud from the borehole. Commonly, this second fluid is a cement slurry. In this method, it is recommended that sufficient of the aqueous treatment fluid be employed to provide at least five and more preferably at least ten minutes contact time with the walls of the borehole or annulus through which the treatment fluid is to be pumped at whatever the desired pump rate. Since the volume of the borehole or annulus through which the aqueous treatment fluid will be pumped is known as is the desired pump rate, the volume of aqueous treatment fluid to be employed in order to attain such contact time is readily calculated.

The preferred pumping rate of the treatment fluid in such an application is less than 16 barrels per minute, more preferably less than about 12 barrels per minute and most preferably less than about 8 barrels per minute and is preferably greater than about 1, more preferably greater than about 2 and most preferably greater than about 3 barrels per minute. The aqueous treatment fluid is employed in a borehole having a bottom hole circulating temperature preferably below about 350° F., more preferably below about 250° F. and most preferably below about 200° F. and is preferably employed at a minimum B.H.C.T. of about 80° F., more preferably greater than about 100° F. and most preferably greater than 125° F. In one preferred mode, it is employed in a borehole with a B.H.C.T. between about 125° and 145° F. and in another preferred embodiment is employed in a borehole with a B.H.C.T. between about 150° and about 250° F.

Many of the wells in which a good cement bond is essential are found offshore. Another preferred embodiment of the invention employs an aqueous treatment fluid which further comprises sodium chloride in an amount of about 1 to about 18 percent, more preferably about 1 to 3 percent, based upon the weight of water. As noted before, the presence of sodium chloride or another salt such as potassium chloride serves to depress the gel temperature of Component A of the invention composition.

The foregoing will generally serve to describe the invention to the reader and enable him to practice the invention within the guidelines outlined above, and the following exemplary embodiments will further describe the invention and prepare the reader to practice same.

SPECIFIC EMBODIMENTS OF THE INVENTION:

A composition of the invention is prepared by dry blending about 11.7 parts of Klucel J hydroxypropylcellulose, sold by Hercules, Inc.; about 8.9 parts by weight 7L carboxymethylcellulose also sold by Hercules, Inc.; about 23.3 parts of a Wyoming bentonite which meets the specification set forth API standard 10A; and about 6.1 parts Lomar D surfactant, a sodium polynaphthalene sulfonate sold by Nopco Chemical, (all parts by weight herein unless otherwise designated). As can be seen by reference to the preceding body of this specification, the first component corresponds to Component A of the invention, the combination of the second and third components corresponds to Component B of the invention and the fourth component corresponds to Component C of the invention. Additionally, a small quantity of a dye may be added to the composition to aid in identification of the returns from a wellbore if desired. A blend of the foregoing components is hereafter referred to as Blend A and is employed in the following examples to prepare an aqueous treatment fluid by adding 16.3 pounds of Blend A to 41 gallons of fresh water to make one barrel of aqueous treatment Fluid A having a density of 8.6 pounds per gallon (hereafter ppg). To prepare an aqueous treatment fluid of greater density, a quantity of weighting agent is either preblended with the dry Blend A or added after Blend A is dispersed into the water. The amount of weighting agent to be employed can be determined from the following equation $X=(42 P-362)/(1-VP)$ where X represents pounds of weighting agent to be added per barrel of aqueous treatment fluid, V represents the absolute volume of the weighting agent in gallons per pound and P represents the density of the treatment fluid desired in pounds per gallon. For barite, which is employed to weight the aqueous treatment fluids in the following examples, $V=0.0278$. Generally the aqueous treatment fluid should be designed to have a greater density than the drilling mud which it will be displacing but less density than the fluid which is following it, e.g. the cement slurry. Preferably, it should be at least about 0.2 ppg heavier than the drilling mud and more preferably at least 1 ppg heavier than the drilling mud.

EXAMPLE 1—MUD COMPATIBILITY

A sample of aqueous treatment Fluid A is prepared in the manner described above and weighted to a given density with the appropriate quantity of barite. Samples of synthetic drilling muds are prepared and then mixed in various proportions with aqueous treatment Fluid A weighted with barite to a density approximately 1 ppg greater than that of the mud. The respective apparent viscosity (expressed as $\theta_{300}$ reading) is measured on the model 35 Fann VG viscometer, as previously described at a 300 rpm reading. Fluid B is the same composition as Fluid A except that 1% (based on weight of water, BWOW) of a nonionic surfactant, a 10 mole adduct of ethylene oxide to di(sec-butyl) phenol is added for better compatibility with oil-based mud.

The drilling mud samples are prepared by thoroughly mixing the dry components with fresh water in a waring blender and are then permitted to hydrate for about a 24 hour period. The compositions are:

Mud A:
 Density—10 ppg
 500 parts water
 20 parts Wyoming bentonite
 125 parts barite Mud B:
 Density—14 ppg
 500 parts water
 30 parts Wyoming bentonite
 2.5 parts Q-Broxin lignosulfonate marketed by Baroid
 540 parts barite Mud C:
 Density—13.2 ppg
 A commercial invert emulsion based mud obtained directly from field operations which is prepared from a concentrate marketed as Vertoil by Magcobar and which contains a bentonitic clay in the aqueous phase and is weighted with barite.

| | Compatibility Data - Mud | | | |
|---|---|---|---|---|
| Run No. | Fluid | Mud | Fluid:Mud Vol. Ratio | $\theta_{300}$ Reading |
| 1 | A(11 ppg) | A | 0:100 | 8 |
| 2 | A(11 ppg) | A | 50:50 | 40 |
| 3 | A(11 ppg) | A | 100:0 | 70 |
| 4 | A(15 ppg) | B | 0:100 | 20 |
| 5 | A(15 ppg) | B | 50:50 | 107 |
| 6 | A(15 ppg) | B | 100:0 | 104 |
| 7 | B(14 ppg) | C | 0:100 | 84 |
| 8 | B(14 ppg) | C | 50:50 | 60 |
| 9 | B(14 ppg) | C | 100:0 | 47 |

As the data demonstrates, good compatibility exists between the aqueous treatment fluids and the various muds.

EXAMPLE 2—CEMENT COMPATIBILITY

Several cement slurries are prepared from commonly available cementing materials and are tested for their compatibility with Fluid A in a fashion similar to that employed in Example 1 by mixing and then comparing the resulting $\theta_{300}$ reading to that of Fluid A, alone and the cement slurry, alone. Fluid A is weighted to 12 to 15 ppg with barite.

The cement slurries are made up as follows: (all parts by weight)

Cement A:
 Density—18 ppg
 596 parts Oklahoma Class H cement
 226 parts water
 6 parts dispersant (same as Component C in Fluid A)
 1.2 parts sugar-type high temperature retarder
 179 parts fine sand
 80 parts hematite Cement B:
 Density—16 ppg 678 parts Oklahoma Class H
285 parts water
2 parts lignosulfonate retarder
Cement C:
  Density—13.3 ppg
  307 parts Oklahoma Class H
  153 parts flyash
  339 parts water
  6 parts bentonite
  1 part lignosulfonate retarder

| | Compatibility Data - Cement | | | |
|---|---|---|---|---|
| Run No. | Fluid | Cement | Fluid:Cement Vol. Ratio | $\theta_{300}$ |
| 1 | A(15 ppg) | A | 0:100 | 81 |
| 2 | A(15 ppg) | A | 50:50 | 92 |
| 3 | A(15 ppg) | A | 100:0 | 120 |
| 4 | A(15 ppg) | B | 0:100 | 81 |
| 5 | A(15 ppg) | B | 50:50 | 83 |
| 6 | A(15 ppg) | B | 100:0 | 120 |
| 7 | A(12 ppg) | C | 0:100 | 36 |
| 8 | A(12 ppg) | C | 50:50 | 39 |
| 9 | A(12 ppg) | C | 100:0 | 63 |

Good compatibility between the aqueous treatment fluid and the cement slurries exists, as can be seen from the preceding data.

EXAMPLE 3—TRANSITION TEMPERATURE VARIATION

A sample of Fluid A (unweighted—8.6 ppg) is examined for the effect which addition of sodium chloride has on its transition temperature. This temperature is determined by taking $\theta_{300}$ and $\theta_{600}$ readings at various incremental temperatures over a range and calculating when the yield point of the fluid tested goes to zero, i.e. when $2\theta_{300}-\theta_{600}=0$. The transition temperature for Fluid A, unweighted, is in this fashion determined to be about 135° F. The effect of increasing amounts of salt is apparent from the following table.

| | Transition Temperatures (Base is Fluid A - 8.6 ppg) | |
|---|---|---|
| Run No. | Amount Salt (% BWOW) | Transition Temp. |
| 1 | 0 | about 135° F. |
| 2 | 3 | about 120° F. |
| 3 | 7.5 | about 105° F. |
| 4 | 10 | about 90° F. |

EXAMPLE 4—FLUID LOSS CONTROL

In accordance with API RP 10B Section 8 (1972), for determination of fluid loss, Fluid A is tested at various densities by addition of barite and with varying amounts of salt. Most tests are at 200° F. but in some instances this temperature is varied. The Fluid is tested against a 325 mesh screen at 1000 psi pressure. Fluid loss is reported below.

| | Fluid Loss (Base is Fluid A) | |
|---|---|---|
| Run No. | Density (ppg) | Temperature | Fluid Loss (mL/30 min.) |
| 1 | 9 | 200° F. | 18 |
| 2 | 10 | 200° F. | 21 |
| 3 | 12 | 200° F. | 18 |
| 4 | 15 | 200° F. | 35 |

-continued

| | Fluid Loss (Base is Fluid A) | |
|---|---|---|
| Run No. | Density (ppg) | Temperature | Fluid Loss (mL/30 min.) |
| 5 | 12 | 150° F. | 16 |
| 6 | 12 | 300° F. | 44 |
| 7 | 12 | 400° F. | 120 |

| | Fluid Loss with Salt (Base is Fluid A - all at 200° F.) | | |
|---|---|---|---|
| Run | Density | Salt (% BWOW) | Fluid Loss (mL/30 min.) |
| 8 | 11 | 0 | 18 |
| 9 | 11 | 3 | 18 |
| 10 | 11 | 7 | 28 |
| 11 | 11 | 10 | 43 |
| 12 | 11 | 18 | 50 |
| 13 | 15 | 0 | 35 |
| 14 | 15 | 3 | 36 |
| 15 | 15 | 7 | 90 |
| 16 | 15 | 10 | 74 |
| 17 | 15 | 18 | 107 |

As may be observed from the foregoing, excellent fluid loss control is maintained even at extremely high temperature and with high salt content. Filtration out of Component A from Fluid A above the transition temperature and re-examination of fluid loss for the filtered fluid shows high fluid loss, indicating that precipitated Component A appears to be acting as a very effective fluid loss preventive agent above the transition temperature.

EXAMPLE 5—CEMENT THICKENING TIME

In accordance with API RP 10B, Section 7, (1972) thickening time tests are run at about 197° F. on various mixtures of cement slurries and Fluid A (weighted to 15 ppg with barite) to determine whether the desired retarding effect of common retarders in inhibited by the composition of Fluid A—with fresh or salt water. No undue acceleration is experienced for 20:80 and 40:60 (vol) Fluid A: cement mixtures for slurries employing a lignosulfonate and a sugar-type high temperature retarder, even in the presence of up to 10% salt (BWOW in Fluid A).

EXAMPLE 6—KINEMATIC VISCOSITIES

The kinematic viscosity of Fluid A alone and weighted with barite is determined from the $\theta_{300}$ reading at temperatures from 80° to 180° F., by dividing the $\theta_{300}$ reading (which is equal to the apparent viscosity in centipoises) by the density of the respective fluid. These kinematic viscosities at the various temperatures are shown below.

| | Kinematic Viscosities (Base is Fluid A) | | | |
|---|---|---|---|---|
| Run No. | Density (ppg) | Temperature (°F.) | Yield Point (lb/100 Ft$^2$) | $\theta_{300}$ | Kinematic Viscosity (cps-gal/pound) |
| 1 | 8.6 | 80 | 15 | 53 | 6.2 |
| 2 | 8.6 | 110 | 6 | 29 | 3.4 |
| 3 | 8.6 | 130 | 0 | 14 | 1.6 |
| 4 | 8.6 | 180 | 0 | 10 | 1.2 |
| 5 | 11 | 80 | 14 | 70 | 6.4 |
| 6 | 11 | 110 | 9 | 40 | 3.6 |
| 7 | 11 | 130 | 0 | 18 | 1.6 |

-continued

| Run No. | Density (ppg) | Temperature (°F.) | Yield Point (lb/100 Ft²) | $\theta_{300}$ | Kinematic Viscosity (cps-gal/pound) |
|---|---|---|---|---|---|
| 8 | 11 | 180 | 0 | 9 | 0.8 |
| 9 | 13 | 80 | 15 | 73 | 5.6 |
| 10 | 13 | 110 | 10 | 44 | 3.4 |
| 11 | 13 | 130 | 0 | 21 | 1.6 |
| 12 | 13 | 180 | 0 | 13 | 1.0 |
| 13 | 15 | 80 | 23 | 104 | 6.9 |
| 14 | 15 | 110 | 15 | 60 | 4.0 |
| 15 | 15 | 130 | 0 | 28 | 1.9 |
| 16 | 15 | 180 | 0 | 17 | 1.1 |

Kinematic Viscosities (Base is Fluid A)

EXAMPLE 7—FLUID C

Another aqueous treatment fluid of the invention is prepared in a manner similar to that for Fluid A, above, except that a polyethylene glycol of about 6000 molecular weight is substituted for Component (C) of Fluid A, the sodium polynaphthalene sulfonate.

Fluid C is prepared by adding to 500 parts water, while shearing in a Waring blender, about 30.5 parts of the following blend of materials (by weight):

26.2 parts Klucel J hydroxypropylcellulose
8.2 parts 7L Carboxymethylcellulose
10 parts Wyoming bentonite
10 parts polyethylene glycol—6000 mol. wt.

The resulting Fluid C has a density of 8.6 ppg. To attain the following densities, the respective quantities of barite are added to Fluid C having the foregoing proportions:

10 ppg—120 parts barite
13 ppg—430 parts barite
14 ppg—545 parts barite

When combined with cement slurries or with a drilling mud of the nature of Mud B, and tested as in Example 1, Fluid C is found to have a transition temperature of approximately 120° F. which is depressed in much the same fashion as Fluid A by addition of salt. Excellent fluid loss of about 15–20 mL/30 min is exhibited by Fluid C at 200° F.

EXAMPLE 8—METHOD OF USE

Fluid A, weighted to about 13.5 ppg with barite, is employed in an intermediate casing cementing operation as spacer to displace an 11.6 ppg water-based drilling mud from a borehole at a depth of about 13,250 feet, having a B.H.C.T. of about 156° F. About 40 barrels of the spacer are pumped down the 7⅝ inch O.D. intermediate casing and up the annulus of the 9⅝ inch borehole at about 6 barrels per minute.

The spacer is followed by about 227 barrels of a 13.8 ppg and then 38 barrels of a 16.7 ppg Class H cement slurry at the same rate. Since 156° F. B.H.C.T. exceeds the temperature of Fluid A, and since 6 barrels per minute pump rate exceeds the critical velocity for Fluid A at that temperature in an annulus of that size, the spacer is in turbulent flow while traveling through the annulus. An excellent cement bond to both casing and borehole wall is obtained as a result.

Having thus described the invention, it will be understood that such description has been given by way of illustration and example and not by way of limitation.

I claim:

1. In a method for injecting a fluid into a borehole containing a drilling mud, wherein the fluid is not compatible with the mud and wherein injection of said fluid is preceded by injection of a composition compatible with both the mud and the fluid, the improvement comprising: injecting a sufficient quantity of said composition to separate said mud and said fluid, at an injection velocity which exceeds the critical velocity for said composition in the borehole at the bottom hole circulating temperature of said borehole, where the composition comprises an aqueous treatment fluid which has a yield point of zero at a temperature between about 85° and about 160° F. and is compatible with cement slurries and drilling muds employed in the completion and drilling of subterranean boreholes, which treatment fluid comprises:

Component (A) A viscosifier which is soluble in and increases the kinematic viscosity of water at temperatures between about 40° and about 100° F. and which becomes substantially insoluble in said treatment fluid at a temperature between about 85° and about 160° F.;

Component (B) A thickener which is different than Component (A) and is soluble or dispersible in and increases the kinematic viscosity of water at temperatures between about 40° and about 160° F.;

Component (C) A dispersant which enhances the dispersibility of Component (A) in water;

Component (D) A weighting agent; and

Component (E) Water;

wherein said Components are present in amounts sufficient to impart a kinematic viscosity to said treatment fluid, at a temperature between about 85° and about 160° F., of greater than about 0.1 and less than about 7.5 centipoise-gallons/pound.

2. The method of claim 1 wherein the fluid injected comprises an aqueous cement slurry.

3. The method of claim 1 wherein the mud is a water-based mud.

4. The method of claim 1 wherein the mud is an oil-based mud and the composition further comprises Component (F), a nonionic surfactant, in an amount sufficient to render the treatment fluid compatible with said oil-based mud.

5. The method of claim 2, 3 or 4 wherein Component (A) of the treatment fluid compires a hydroxypropylcellulose and Component (B) comprises a carboxymethylcellulose and a water-swellable extender.

6. The method of claim 5 wherein the kinematic viscosity of the aqueous treatment fluid is between about 0.3 and about 6.5 centipoise-gallons/pound.

7. The method of claim 3 or 4 wherein the fluid injected comprises an aqueous hydraulic cement slurry.

8. The method of claim 7 wherein the fluid is injected at a flow rate of from about 1 to about 12 barrels per minute.

9. The method of claim 8 wherein the bottom hole circulating temperature (B.H.C.T.) is between about 85° and about 350° F.

10. The method of claim 9 wherein the B.H.C.T. is between about 150° and about 250° F.

11. The method of claim 9 wherein the B.H.C.T. is between about 125° and about 145° F.

12. The method of claim 7 wherein said fluid injected is thixotropic.

13. The method of claim 7 wherein the aqueous treatment fluid further comprises sodium chloride in an amount of about 1 to about 18 percent, based on the weight of Component (E).

14. The method of claim 7 wherein the kinematic viscosity of the aqueous treatment fluid is between about 0.3 and about 6.5 centipoise-gallons/pound.

15. The method of claim 7 wherein said aqueous treatment fluid, Component (A) comprises a hydroxyalkylcellulose, Component (B) comprises a combination of a carboxymethylcellulose and a water-swellable extender, Component (C) comprises a sulfonated hydrocarbon compound or salt thereof, and Component (F), where present, comprises a nonionic, alkoxylated alcohol.

16. The method of claim 15 wherein Component (A) comprises a hydroxypropylcellulose, Component (B) comprises a combination of a carboxymethylcellulose and bentonite, Component (C) comprises a sodium salt of a sulfonated polynaphthalene and Component (F), where present, comprises an ethoxylated- alkanol or -alkylphenol.

17. The method of claim 7 wherein said aqueous treatment fluid, Component (A) comprises about 0.1 to about 1.5 percent, Component (B) comprises about 0.5 to about 4 percent, Component (C) comprises about 0.1 to about 2.5 percent, Component (E) comprises about 90 to about 98 percent and Component (F) comprises about 0 to about 2 percent of the combined weight of said components of said treatment fluid.

18. The method of claim 17 wherein Component (D) is present in an amount of about 1.5 percent to about 150 percent based on the combined weight of Components (A), (B), (C), (E) and (F).

* * * * *